July 2, 1935. J. B. ROY 2,006,965
FEEDING HOPPER FOR IRREGULAR SHAPED ARTICLES
Filed Aug. 12, 1933  3 Sheets-Sheet 1
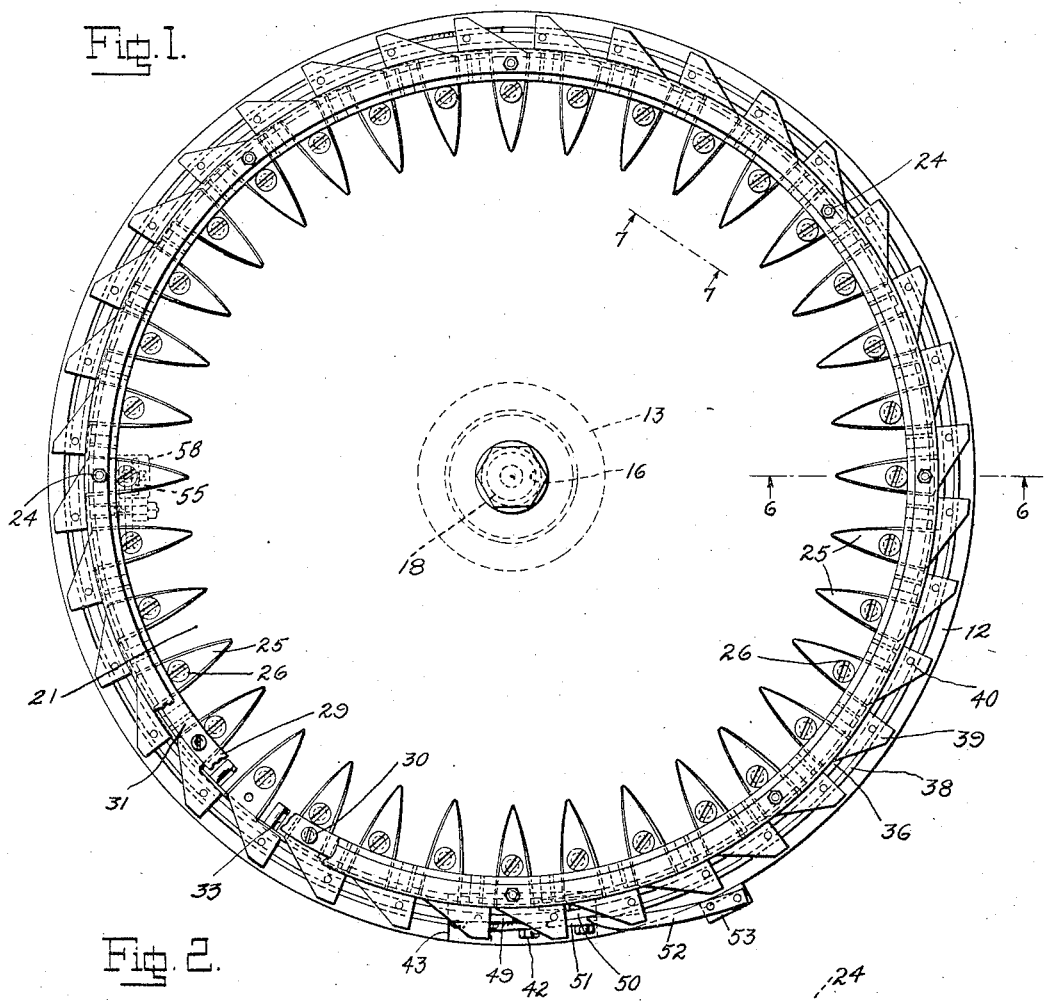
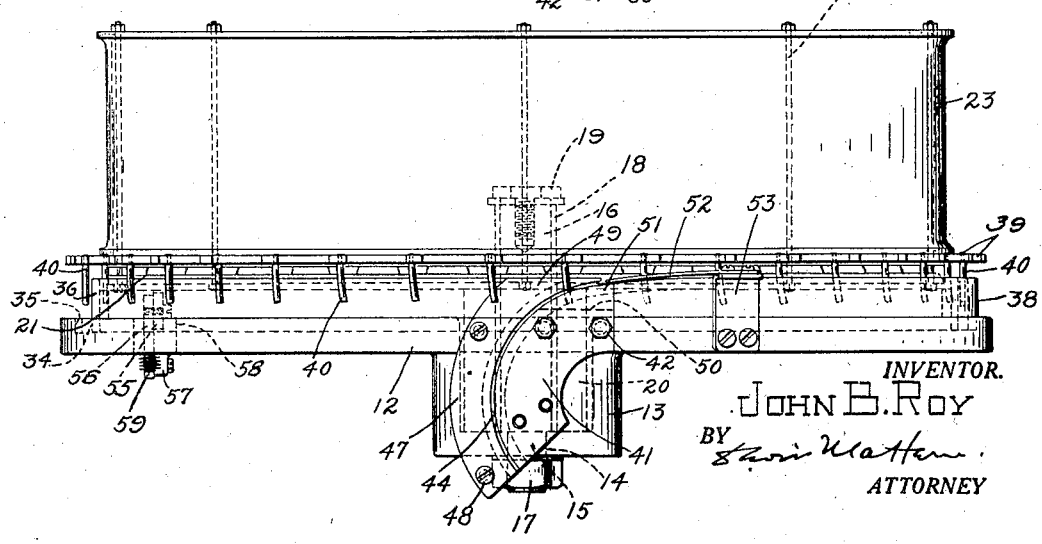
INVENTOR.
John B. Roy
BY
ATTORNEY July 2, 1935.  J. B. ROY  2,006,965
FEEDING HOPPER FOR IRREGULAR SHAPED ARTICLES
Filed Aug. 12, 1933  3 Sheets-Sheet 2
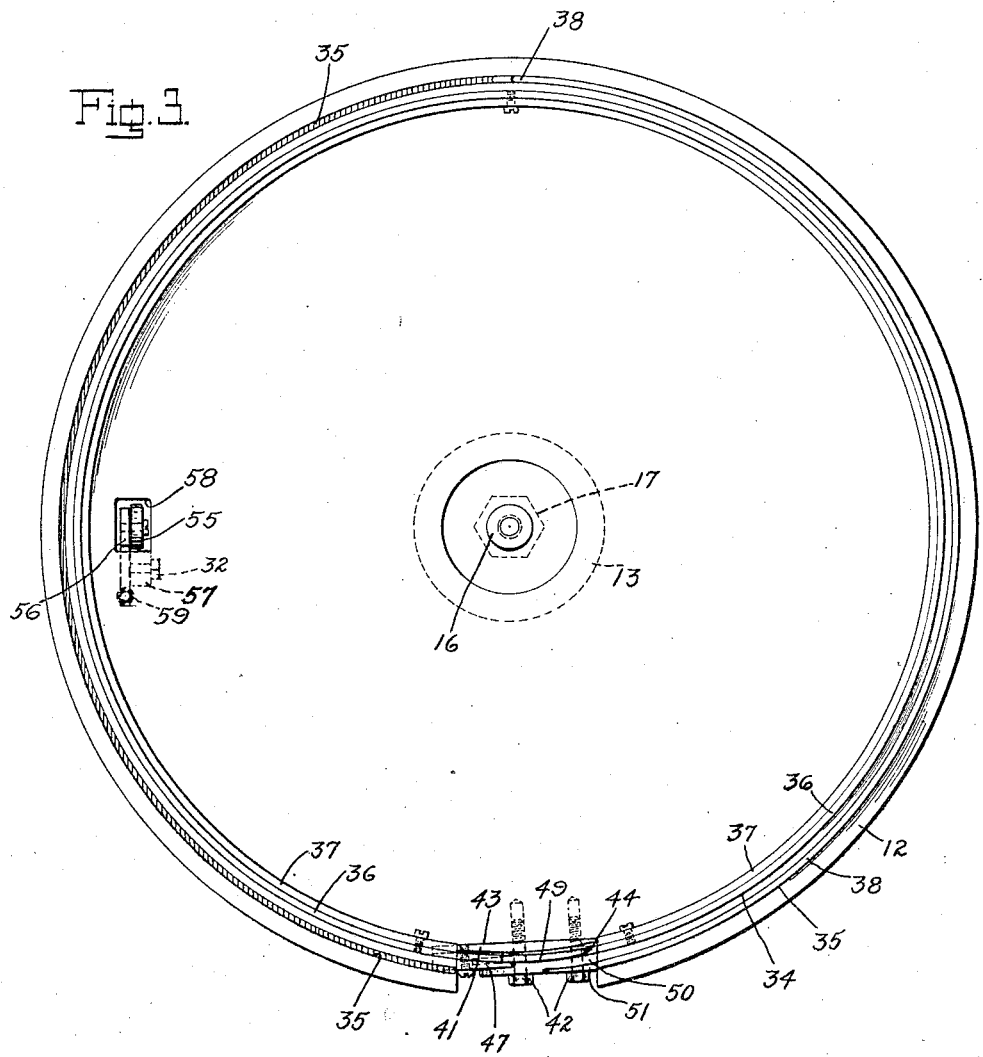
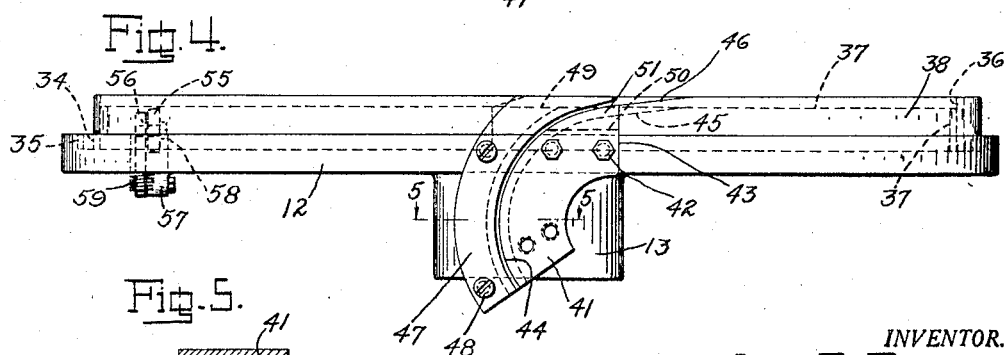
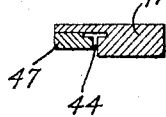
INVENTOR.
John B. Roy.
BY
ATTORNEY

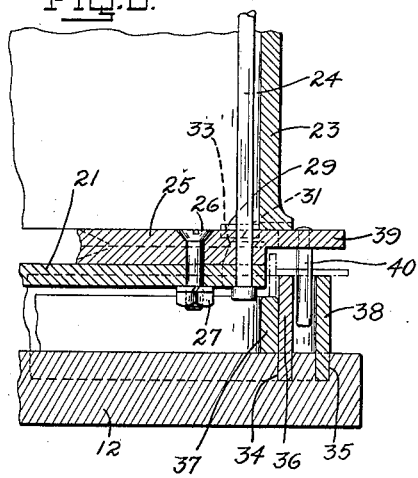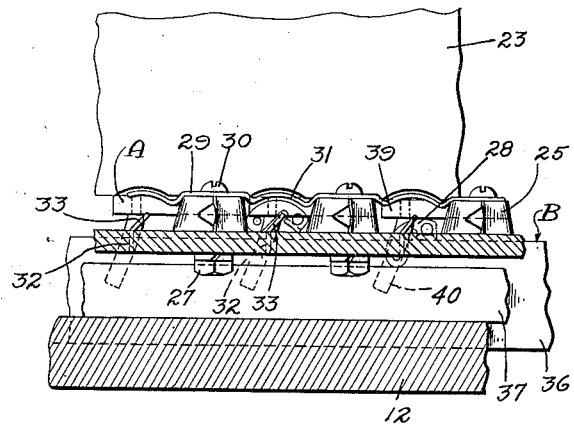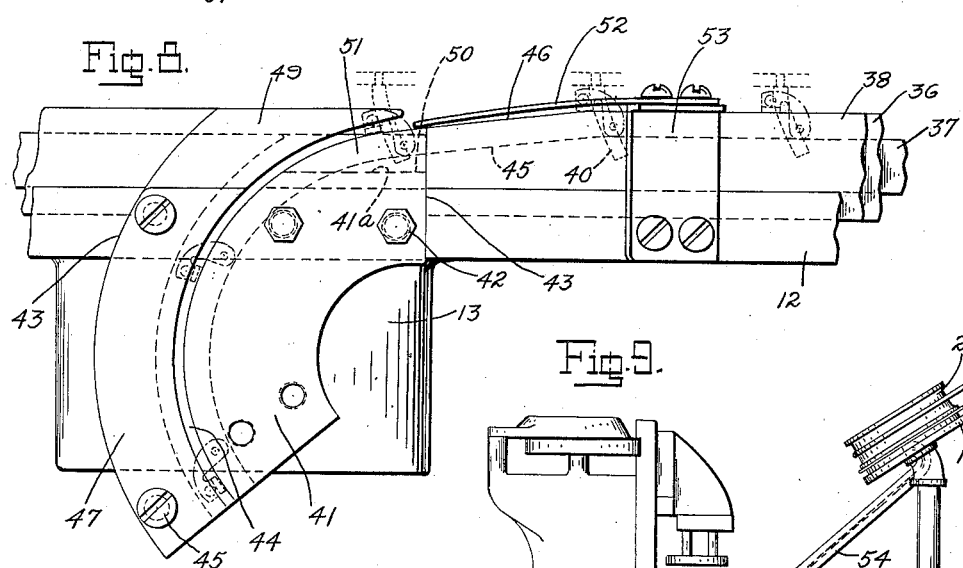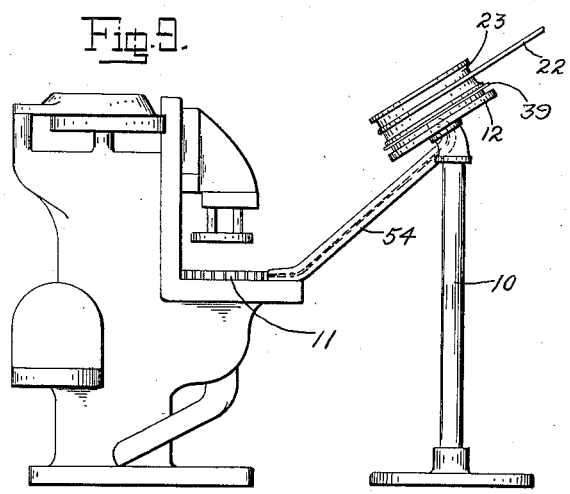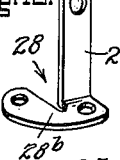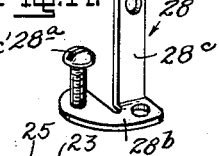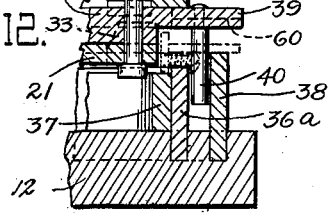

Patented July 2, 1935

2,006,965

UNITED STATES PATENT OFFICE 2,006,965

FEEDING HOPPER FOR IRREGULAR SHAPED ARTICLES

John B. Roy, Bridgeport, Conn., assignor to Clark Metal Products, Inc., Bridgeport, Conn., a corporation of Connecticut Application August 12, 1933, Serial No. 684,852

1 Claim. (Cl. 113—113)

The present invention relates to a feeding hopper for irregular shaped articles, particularly articles which are not flat, as for instance the formed plug and binding post member of an electrical plug device, an object being to provide such a machine into which a large quantity of the devices may be placed and which will then arrange and feed them in a predetermined position, this position being, for instance, one in which the articles may be fed into a dial type machine for the purpose of a forming or assembling operation on the article, as for instance the attachment thereto of the binding post screw. It will be understood that the machine may be used for the feeding of other articles than those particularly described herein.

With the above and other objects in view an embodiment of the invention is shown in the accompanying drawings, and this embodiment will be hereinafter more fully described with reference thereto, and the invention will be finally pointed out in the claim.

In the drawings:

Fig. 1 is a plan view of the hopper, according to the exemplary illustrated embodiment of the invention.

Fig. 2 is a side view thereof.

Fig. 3 is a plan view of the stationary base plate, the rotatable hopper normally disposed above it being removed.

Fig. 4 is a side view of the base plate.

Fig. 5 is a sectional view taken along the line 5—5 of Fig. 4.

Fig. 6 is a detail enlarged sectional view, taken along the line 6—6 of Fig. 1.

Fig. 7 is a detail enlarged sectional view, taken along the line 7—7 of Fig. 1.

Fig. 8 is an enlarged detail view showing the feeding chute portion.

Fig. 9 is a side elevation showing the hopper in its relation to the dial type assembly machine, or other machine to which it feeds the articles.

Fig. 10 is a perspective view of one of the articles adapted to be fed in the machine.

Fig. 11 is a perspective view of an article similar to that shown in Fig. 10 but with a binding post screw attached, and which is adapted to be fed by a modification of the invention.

Fig. 12 is a fragmentary sectional view, similar to Fig. 6 and showing the modification of the invention for feeding the articles shown in Fig. 11.

Similar reference characters indicate corresponding parts throughout the several figures of the drawings.

Referring to the drawings, the feeding hopper according to the exemplary illustrated embodiment of my invention, is mounted upon a stand 10 in inclined relation in front of the dial assembly machine 11, or other machine to which the articles are to be fed.

The hopper which is of circular form comprises generally a circular base fixed to the upper end of the stand 10 and a cylindrical receptacle rotatably mounted on said base. For clearness in describing the invention it should be explained that as shown in Figs. 1 to 4 the right hand side of these figures is the downwardly disposed part in the inclined operative position as shown in Fig. 9.

The stationary base comprises a flat circular plate 12 having a central hub 13 at its under side which is set into and secured in the upper end of the stand 10, this hub being recessed at the upper side and having a central aperture 14 in its base in which the reduced and threaded end 15 of a central upstanding post or stud 16 is secured by means of a nut 17. A bearing sleeve 18 is rotatably engaged upon the post 16 and is retained by means of a cap screw 19, said sleeve being tightly engaged and secured in the opening of the central hub 20 of the base 21 of the rotatable hopper receptacle.

While any suitable means may be provided for rotating the hopper I have shown by way of example, in Fig. 9, a drive belt 22 extending about the cylindrical wall 23. The wall 23 is secured to the base 21 by means of a series of tie rods 24, the lower edge of the wall being separated from the base by a series of spaced guide members 25, as shown in Figs. 6 and 7, and presently to be more fully described.

The guide members 25 are in the form of arrow shaped blocks disposed in radial relation with their pointed ends directed inwardly and secured to the base 21 by bolts 26 having nuts 27 engaged at the under side of the base. The spaces between these blocks have a peculiarly shaped passage which only permits the irregularly shaped articles 28 to emerge in one position. For this purpose a band 29 is secured by means of screws 30 upon the tops of the blocks adjacent the wall 23 and the portions of the band extending across the blocks are arcuately shaped, as at 31, to substantially conform to the arcuate outline of the base 28$^b$ of the article 28, and between the blocks and set in slots 32 in the base 21 are inclined flanges 33, which will permit the article to pass when the slotted base of the article is in such position that its slot will register with said fingers, the prong portion 28ᶜ of the article being outwardly in this position.

During rotation of the hopper the articles are disposed by gravity at the lower portion, that is, at the right hand side as shown in Figs. 1 and 2, and a number of them will through the agitating action of the blocks 25 become so arranged as to emerge through the passages. Any of the articles that are between the blocks but that are not in the proper position to emerge past the flanges 33 drop by gravity as they reach the upper side of the hopper.

As the articles emerge they are received upon a trackway provided on the base and are then conveyed into relation with a chute.

The stationary base 12 is provided outwardly of the base 21 of the hopper receptacle with a pair of spaced annular grooves 34 and 35, the inner groove 34 having a cylindrical flange 36 set therein, the upper end of which is slightly below the upper surface of the base 21 of the hopper and is also outwardly spaced from the periphery of said base 21 a distance slightly greater than the metal thickness of the article 28. A cylindrical ring 37 is disposed at the inner side and against the ring 36, its upper end being slightly below the base 21 of the hopper receptacle. Within the lower half of the outer groove 35 a substantially semicircular flange 38 is set, of the same height as the flange 36.

The blocks 25 are each provided at the outer ends with an outwardly extending flange 39 which also extends at one side across the space between the blocks, the inner wall of this flange being substantially aligned with the inner surface of the flange 36, and the under surface being above and outwardly offset from the upper surface of the base 21 of the hopper receptacle to provide a space through which the prong portion of the article may pass, the inner wall forming an abutment against which the base of the article strikes to limit the degree of emergence, as shown at A, Fig. 7. As soon as the base of the article passes between the blocks 25 beyond the periphery of the base 21 it tips down into engagement with the upper surface of the ring 37, the prong portion of the article resting flatly upon the upper surfaces of the flanges 36 and 38, as shown at B, in Fig. 7, and in dot-and-dash lines in Fig. 6. Fingers 40 secured to the flanges 39 project downwardly between the flanges 36 and 38 behind the prong portion of the article and move it along the trackway provided by the flanges 36 and 38, the ring 37 and the periphery of the hopper receptacle.

At the end of the trackway the articles move into relation with a chute interposed in the trackway. This chute comprises a member 41 of arcuate form secured by screws 42 in a recess 43 in the base 12 in the path of the trackway and having an arcuate T-slot 44 arranged in continuation of the trackway and adapted to receive the articles with their bases set in the base of the T-slot and their prongs projecting through the slot, as shown in Fig. 8. As shown in Fig. 5 one side of the T-slot is formed by a separate arcuate plate 47 secured by screws 48 to the member 41. The base of the T-slot has its lower end disposed in line with the upper surface of the ring 37, the end of which is inclined downwardly, as at 45, while the slot of the T-slot has its end aligned with upper surfaces of the flanges 36 and 38, the ends of which are downwardly inclined as at 46, so that the prong of the articles will move into the slot.

In order to guide the articles into the T-slot, the plate 47 is provided at its upper end with a flange 49 disposed in spaced relation in line with the outer surface of said flange 36, while the upper end of the member 41 is slotted, as at 50, in line with the slot between the flanges 36 and 38 and is provided with a flange 50 in line with the end of the flange 37. The slot 50 permits passage of the fingers 40 through the upper end of the chute.

In order to insure proper entry of the articles into the T-slot a spring finger 52 is mounted on a bracket 53 and has its end bearing downwardly across the entrance to the T-slot. As the articles approach the T-slot they move under this finger and are thus positively guided into the slot.

The chute member is provided with a downwardly inclined extension 54, Fig. 9, along which the articles are guided to the dial machine 11.

Should any of the articles pass beyond the chute they will merely drop to the floor as there is no outer flange 38 to support them at the upper half of the hopper.

In order to prevent any of the articles from sticking between the blocks 25 the hopper is intermittently jarred, and for this purpose a roller 55, mounted upon a lever 56 pivoted to a boss 57 formed on the base 12, projects through a hole 58 in the base and is pressed into engagement with the base of the revolving hopper receptacle by means of a spring 59 disposed between the outer end of the lever 56 and the base 21. The roller is in the path of the nuts 27 so that as the hopper revolves the roller successively taps upon the base as each nut passes over the roller thereby jarring loose any articles that may have stuck between the blocks 25.

It will be understood that in accordance with my invention other irregular shaped articles than those shown may be fed, merely by changing the shape of the passages between the blocks 25 to permit their emergence only in a given position, and by arranging the trackway to receive and guide them.

Thus in Fig. 11 I have shown one of the articles similar to the one shown in Fig. 10 but having a screw set 28ª in its base 28ᵇ, and in Fig. 12 I have shown a modification of the machine to feed these articles. In this case the flange 39 is grooved out at its under side, as at 60 to permit passage of the screw and the inner flange 36ª of the track has its upper surface lower than the upper surface of the flange 38, and slightly higher than the upper surface of the ring 37, so that when the article tips down on the track as in the position indicated at B in Fig. 7 the screw rests on the upper surface of the flange 36 and the article is confined against outward movement by the inner surface of said flange 36, as clearly shown in dot-and-dash lines in Fig. 12. A suitable slot will be provided in the chute to clear the screw.

I have illustrated and described a preferred and satisfactory embodiment of the invention, but it will be obvious that changes may be made therein, within the spirit and scope thereof, as defined in the appended claim.

Having thus described my invention, what I claim and desire to secure by Letters Patent is:—

A feeding apparatus for irregular shaped non-flat articles, comprising a stationary support, a rotatable receptacle on said support having a base and a side wall, there being a series of spaced radial openings in said side wall adjacent said base through which the articles are adapted to emerge, abutment means on said receptacle in relation to said openings adapted to limit the radial emergence of said articles, an annular trackway on said support in relation to said receptacle to receive said articles as they emerge, propeller means carried by said receptacle disposed in relation to said trackway and adapted to move said articles along said trackway, and conveyor means in communication with said trackway into which said articles are moved from said trackway by said propeller means.

JOHN B. ROY.